April 9, 1929.  S. AOKI  1,708,751

RECTIFYING SYSTEM

Filed April 25, 1927

Inventor:
Sataro Aoki,
by
His Attorney.

Patented Apr. 9, 1929.

1,708,751

UNITED STATES PATENT OFFICE.

SATARO AOKI, OF EBARA, TOKYO, JAPAN, ASSIGNOR TO GENERAL ELECTRIC COMPANY, A CORPORATION OF NEW YORK.

RECTIFYING SYSTEM.

Application filed April 25, 1927, Serial No. 186,201, and in Japan June 23, 1926.

My invention relates to rectifying systems wherein power is transmitted between direct and alternating current circuits through means comprising main and interphase transformers, and has for its principal object the provision of an improved transformer which may be utilized in such systems to perform the functions heretofore performed by both the main transformer and the interphase transformer.

It is well known that in the operation of a recitifier comprising a cathode and a plurality of anodes, each connected to a different phase of an alternating current circuit, current is successively carried by each of the anodes during a period of time dependent on the number of phases and the frequency at which power is delivered to the rectifier. It is customary to connect such a rectifier to the alternating current circuit through a main transformer provided with two three-phase secondary windings which have their neutral terminals interconnected through an absorption coil or interphase transformer and are arranged to produce three-phase voltages 180° out of phase with one another. With these connections, the voltage difference between the phases simultaneously transmitting current is absorbed in the interphase transformer and the voltages of the anodes simultaneously transmitting current are maintained substantially equal. In accordance with my invention, the same result is produced by means comprising an additional leg on the core of the main transformer.

My invention will be better understood from the following description when considered in connection with the accompanying drawings, and its scope will be pointed out in the appended claims.

Figure 1:
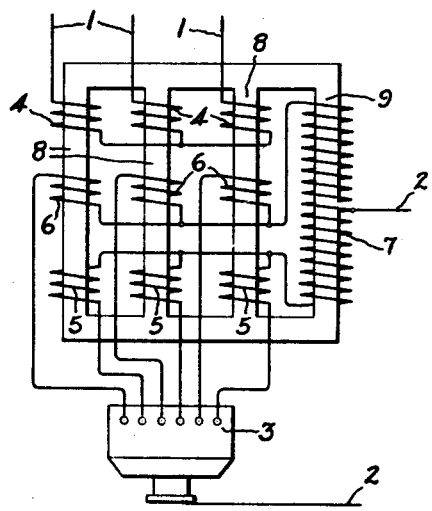
Figure 2:
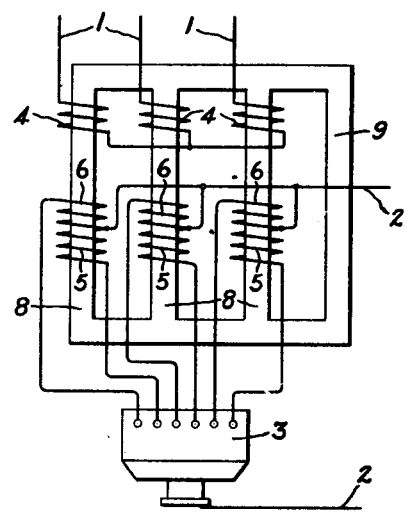
Figure 3:
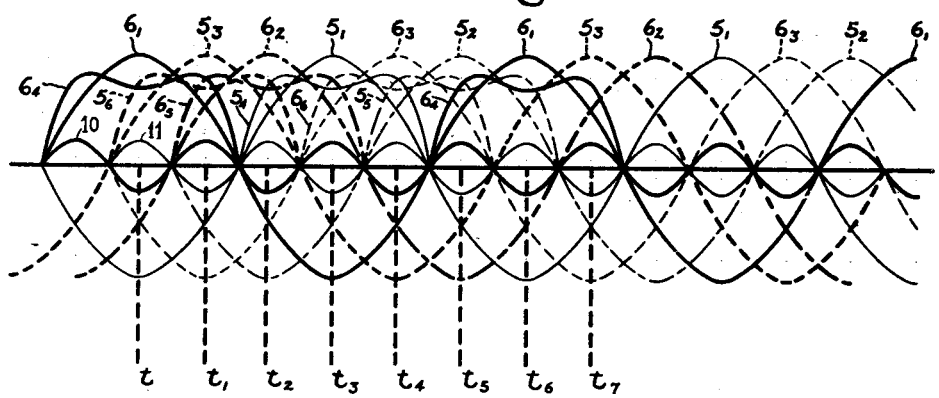
Figure 4:
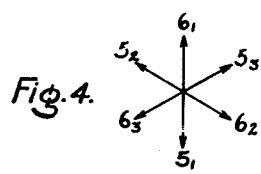

Referring to the drawings, Figs. 1 and 2 diagrammatically show rectifying systems wherein my invention has been embodied; and Figs. 3 and 4 relate to the operation of these systems.

Fig. 1 shows alternating current terminals 1 and direct current terminals 2 which are interconnected through means comprising a rectifier 3 and a polyphase transformer provided with a star-connected primary winding 4, with an absorption coil or interphase transformer winding 7, and with a pair of star-connected secondary windings 5 and 6 arranged to produce polyphase voltages which are 180° out of phase with one another. The windings 4, 5 and 6 are wound on the legs 8 of the transformer core in the usual manner. The coil 7 is wound on a leg 9 of the transformer, is connected between the neutral terminals of the windings 5 and 6, and is provided with an intermediate terminal which is connected to one of the direct current terminals 2. With these connections, the primary winding 4 and the interphase transformer winding 7 tend to produce in the cores 8 and 9 fluxes which have triple the frequency of the power delivered at the terminals 1 and react upon the secondary windings 5 and 6 in a manner to maintain substantial equality between the voltages of the anodes simultaneously transmitting.

The manner in which this result is accomplished will be readily understood upon reference to Figs. 3 and 4 wherein the voltages that would be induced in the windings 5 and 6 in the absence of the triple frequency flux are indicated by the numerals $5_1$, $5_2$, $5_3$, $6_1$, $6_2$ and $6_3$, the voltages produced in the windings 5 and 6 by the triple frequency flux are respectively indicated by the curves 10 and 11, and the resultant voltages produced in the windings 5 and 6 and applied to the anodes of the rectifier are indicated by $5_4$, $5_5$, $5_6$, $6_4$, $6_5$ and $6_6$. It will be observed that the voltage $6_4$ is the resultant of the voltages $6_1$ and 10; that the voltage $5_6$ is the resultant of the voltages $5_3$ and 11; that the voltage $6_5$ is the resultant of the voltages $6_2$ and 10; that the voltage $5_4$ is the resultant of the voltages $5_1$ and 11; that $6_6$ is the resultant of the voltages $6_3$ and 10; and that the voltage $5_5$ is the resultant of the voltages $5_2$ and 11. With these resultant voltages each applied to a different anode of the rectifier, current will be transferred from one anode to another at the instants $t$, $t_1$, $t_2$, $t_3$, $t_4$, $t_5$ and $t_6$, and current will be transmitted through different pairs of the anodes during the time intervals $t-t_1$, $t_1-t_2$, $t_2-t_3$, $t_3-t_4$, $t_4-t_5$ and $t_5-t_6$, due to the fact that the voltages of these pairs are substantially equal during the indicated intervals. Thus, the resultant anode voltages $6_4$ and $5_6$ are substantially equal during the interval $t-t_1$, the anode voltages $5_6$ and $6_5$ are substantially equal during the interval $t_1-t_2$, the anode voltages $6_5$ and $5_4$ are substantially equal during the interval $t_2-t_3$, the anode voltages $5_4$ and $6_6$ are substantially equal during the interval $t_3$—$t_4$, the anode voltages $6_6$ and $5_5$ are substantially equal during the interval $t_4$—$t_5$ and the anode voltages $5_5$ and $6_4$ are substantially equal during the interval $t_5$—$t_6$.

It should be noted that the triple frequency voltage 10 of the winding 6 and the triple frequency voltage 11 of the winding 5 are produced by the same triple frequency flux and are 180° out of phase with one another because the windings 5 and 6 are arranged to produce opposed voltages. Since this triple frequency flux is transmitted through all the core legs simultaneously, its effect on the terminal voltage of the winding 1 is nil.

The fact that a part of the triple frequency voltages required to balance the voltages of the anodes simultaneously transmitting current is produced by the primary winding 4 makes it possible to reduce the size of the interphase transformer winding 7. As indicated by Fig. 2, this winding may be altogether omitted. One way of producing the triple frequency flux in the absence of the interphase transformer is to so arrange the windings and core of the transformer that the core is operated at or near saturation. It will be understood that this flux may also be produced in other ways. While I have described my invention as applied to a transformer provided with a secondary circuit connected in star, it will be apparent that its advantages are not limited to this particular type of connection.

The embodiments of the invention illustrated and described herein have been selected for the purpose of clearly setting forth the principles involved. It will be apparent, however, that the invention is susceptible of being modified to meet the different conditions encountered in its use, and I, therefore, aim to cover by the appended claims all modifications within the true spirit and scope of my invention.

What I claim as new, and desire to secure by Letters Patent of the United States, is:

1. The combination of a transformer including a multi-leg core, polyphase windings wound only on some of said legs and provided with end and neutral terminals and an interphase winding wound on the other of said legs and connected between said neutral terminals, and a rectifier provided with a plurality of anodes connected to said end terminals and with a cathode, and direct current terminals connected to said cathode and to a terminal intermediate the ends of said interphase winding.

2. In a system for interconnecting direct and alternating current circuits, the combination of a multi-leg core, polyphase windings wound only on some of said legs and provided with end and neutral terminals, and an interphase winding wound on the other of said legs and connected between said neutral terminals.

3. In a system for interconnecting three-phase and direct current circuits, the combination of a core provided with four legs, polyphase windings wound on three of said legs and provided with end and neutral terminals, and an interphase winding wound on the other of said legs and connected between said neutral terminals.

4. In a system for interconnecting three-phase and direct current circuits, the combination of a core provided with four legs, two Y-connected windings wound on three of said legs, and an interphase winding wound on the other of said legs and connected between the neutral terminals of said Y-connected windings.

In witness whereof, I have hereunto set my hand this 4th day of April, 1927.

SATARO AOKI.